(12) United States Patent
Raghavan et al.

(10) Patent No.: US 12,074,670 B2
(45) Date of Patent: Aug. 27, 2024

(54) METHODS FOR BEAM COORDINATION IN A NEAR-FIELD OPERATION WITH MULTIPLE TRANSMISSION AND RECEPTION POINTS (TRPS)

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/652,639

(22) Filed: Feb. 25, 2022

(65) Prior Publication Data

US 2023/0275632 A1  Aug. 31, 2023

(51) Int. Cl.
*H04B 7/06* (2006.01)
*G01S 5/14* (2006.01)
*H04L 5/00* (2006.01)
*H04W 4/02* (2018.01)

(52) U.S. Cl.
CPC .......... *H04B 7/0617* (2013.01); *G01S 5/14* (2013.01); *G01S 5/145* (2013.01); *H04L 5/0048* (2013.01); *H04W 4/023* (2013.01)

(58) Field of Classification Search
CPC ... H04W 4/023; H04B 7/024; H04B 7/06952; H04B 7/0617; H04L 5/0048; G01S 5/14; G01S 5/145
See application file for complete search history.

(56) References Cited

U.S. PATENT DOCUMENTS

| | | | | |
|---|---|---|---|---|
| 2010/0159845 A1* | 6/2010 | Kaaja | ............. | H04W 48/14 455/70 |
| 2010/0309049 A1* | 12/2010 | Reunamaki | ............. | H04W 16/28 342/367 |
| 2014/0369330 A1* | 12/2014 | Sinha | ............. | H04W 8/005 370/338 |
| 2015/0341105 A1* | 11/2015 | Yu | ............. | H04B 7/088 370/328 |
| 2018/0049245 A1* | 2/2018 | Islam | ............. | H04B 7/063 |
| 2018/0115958 A1* | 4/2018 | Raghavan | ............. | H04W 36/32 |
| 2018/0205443 A1* | 7/2018 | Kumagai | ............. | H04B 7/0695 |
| 2018/0279134 A1* | 9/2018 | Malik | ............. | H04W 16/28 |
| 2019/0097712 A1* | 3/2019 | Singh | ............. | H04B 7/0617 |
| 2020/0212978 A1* | 7/2020 | Zhao | ............. | H04B 7/0404 |
| 2021/0257730 A1* | 8/2021 | Ma | ............. | H04B 7/086 |

(Continued)

FOREIGN PATENT DOCUMENTS

| | | | | |
|---|---|---|---|---|
| CN | 115398999 A | * | 11/2022 | ......... G01S 5/0045 |
| EP | 3681226 A1 | * | 7/2020 | ......... G01S 5/0236 |
| WO | WO-2023031709 A1 | * | 3/2023 | ......... H04B 7/0456 |

*Primary Examiner* — Mehmood B. Khan
(74) *Attorney, Agent, or Firm* — Patterson+ Sheridan, L.L.P.

(57) ABSTRACT

Certain aspects of the present disclosure provide techniques for wireless communication by a network entity. The network entity determines a distance between the network entity and a user equipment (UE). The network entity determines a number of beams for beamforming and a beam refinement procedure, based on the distance between the network entity and the UE. The network entity transmits a number of reference signals (RSs), using the determined number of beams.

30 Claims, 14 Drawing Sheets

(56) References Cited

U.S. PATENT DOCUMENTS

| | | | | |
|---|---|---|---|---|
| 2021/0360429 | A1* | 11/2021 | Reial | H04W 8/24 |
| 2022/0039081 | A1* | 2/2022 | Liu | H04W 4/027 |
| 2022/0286867 | A1* | 9/2022 | Siomina | H04W 16/28 |
| 2023/0006713 | A1* | 1/2023 | Zirwas | H04B 7/01 |
| 2023/0314554 | A1* | 10/2023 | Kalantari | G01S 7/003 |
| | | | | 342/59 |
| 2023/0327723 | A1* | 10/2023 | Pan | H04W 56/0015 |
| | | | | 370/329 |

* cited by examiner

METHODS FOR BEAM COORDINATION IN A NEAR-FIELD OPERATION WITH MULTIPLE TRANSMISSION AND RECEPTION POINTS (TRPS)

INTRODUCTION

Aspects of the present disclosure relate to wireless communications, and more particularly, to techniques for beam coordination in a near-field operation in a multi-transmission and reception point (mTRP) system.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by network entity, comprising: determining a distance between the network entity and a user equipment (UE); determining a number of beams for beamforming and a beam refinement procedure based on the distance between the network entity and the UE; and transmitting a number of reference signals (RSs) using the determined number of beams.

Another aspect provides a method for wireless communication by a UE, comprising: determining a distance between the UE and a network entity; transmitting an indication indicating a number of beams for beamforming and a beam refinement procedure determined based on the distance between the network entity and the UE; and receiving a number of RSs using the indicated number of beams at the UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for beam coordination in a near-field operation with multiple transmission and reception points (TRPs).

A multi-transmission and reception point (mTRP) system includes a set of TRPs participating in mTRP communication with a user equipment (UE). Currently, beamforming and beam refinement is such that far-field conditions are assumed to hold for the transmissions from all the TRPs within the set of TRPs to the UE. In some cases, thermal management of the TRPs is dependent on beam processing tasks of the TRPs. For example, when more beams are processed at higher carrier frequencies (e.g., millimeter regime beyond 24.25 GHz), power consumption is high, and with it the heat generated (thermal dissipation) and possibility of overheating of the TRPs.

In the mTRP system, a first subset of the set of TRPs (e.g., TRPs having a small antenna array and/or at far away distances from the UE) may be in a far-field condition to the UE and a second subset of the set of TRPs (e.g., TRPs having a large antenna array and/or at closer distances to the UE) may be in a near-field condition to the UE. In such cases, after an initial acquisition of beams for use (e.g., the set of TRPs jointly transmitting data to the UE), a beam refinement procedure is asymmetric with respect to near-field vs. far-field conditions, since the second subset of the set of TRPs encounter the UE in the near-field, whereas the first subset of the set of TRPs encounter the UE in the far-field. For example, for the beamforming and the beam refinement with the second set of TRPs in the near-field, a lesser number of beams may be needed, relative to a number of beams required for the beamforming and the beam refinement with the first set of TRPs in the far-field. Accordingly, in such cases, the same number of beams are not needed for the beamforming and the beam refinement for all the TRPs within the set of TRPs.

Techniques described herein may consider a near-field operation on beamforming and beam refinement in an mTRP system. For example, each TRP in the mTRP system determines a distance-dependent number of beams (e.g., refinement beams based on the distance between a UE and a TRP) for use in joint communications with the UE. Accordingly, in such cases, some TRPs (e.g., at near-field) may use a lesser number of beams than other TRPs (e.g., at far-field) for the beamforming and the beam refinement.

As a result, the techniques described herein may help improve power consumption as well as thermal management at the TRPs (e.g., due to less heat dissipation as a lesser number of beams are used for the beamforming and the beam refinement).

Introduction to Wireless Communication Networks

Figure 1:
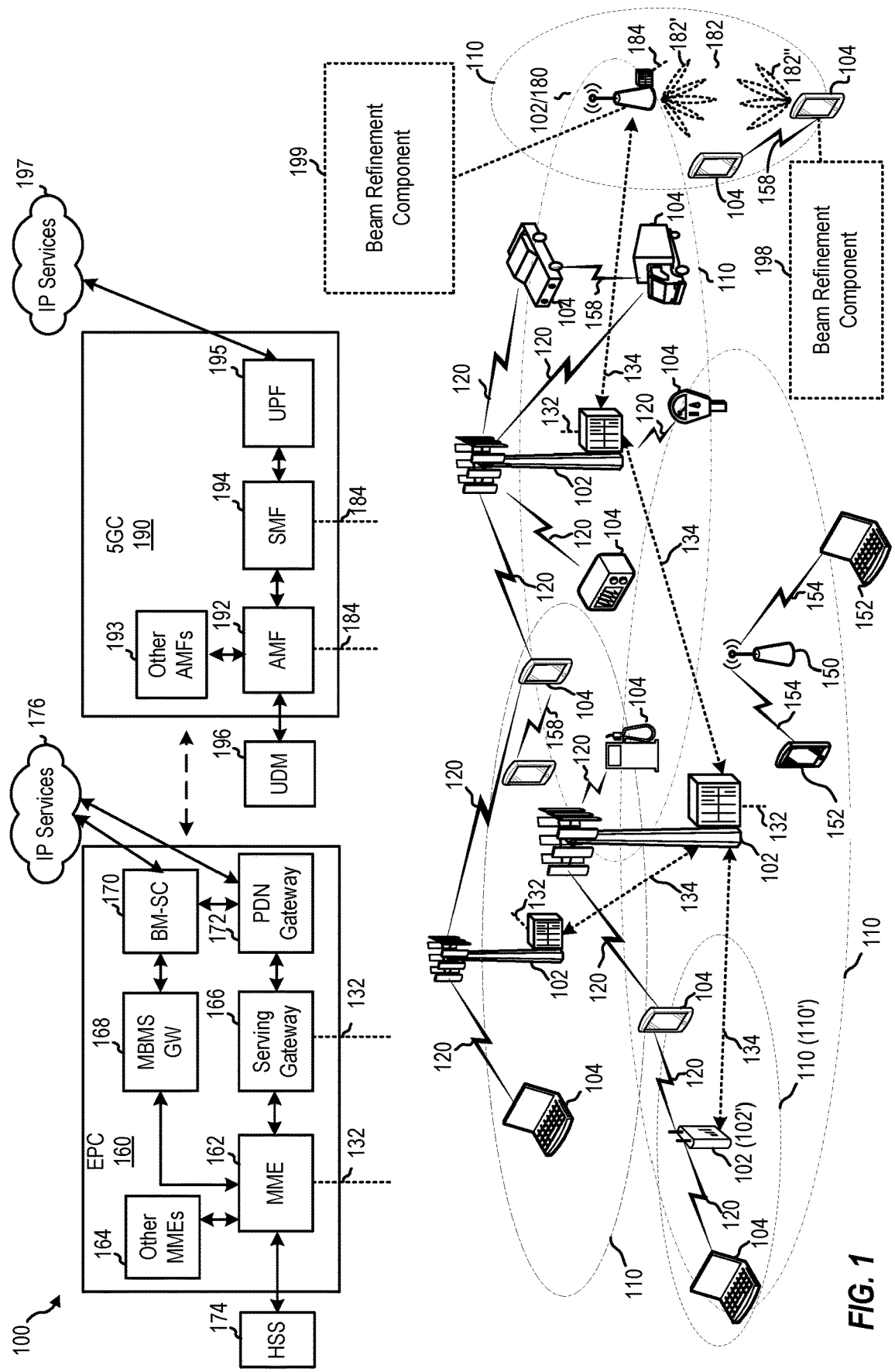
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104 (e.g., having one or more radar devices), one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs may include and/or be referred to as a gNB, NodeB, eNB, ng-eNB (e.g., an eNB that has been enhanced to provide connection to both EPC 160 and 5GC 190), an access point, a base transceiver station, a radio BS, a radio transceiver, or a transceiver function, or a transmission reception point in various contexts.

A BS, such as BS 102, may include components that are located at a single physical location or components located at various physical locations. In examples in which the BS includes components that are located at various physical locations, the various components may each perform various functions such that, collectively, the various components achieve functionality that is similar to a BS that is located at a single physical location. As such, a BS may equivalently refer to a standalone BS or a BS including components that are located at various physical locations or virtualized locations. In some implementations, a BS including components that are located at various physical locations may be referred to as or may be associated with a disaggregated radio access network (RAN) architecture, such as an Open RAN (O-RAN) or Virtualized RAN (VRAN) architecture. In some implementations, such components of a BS may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 9:
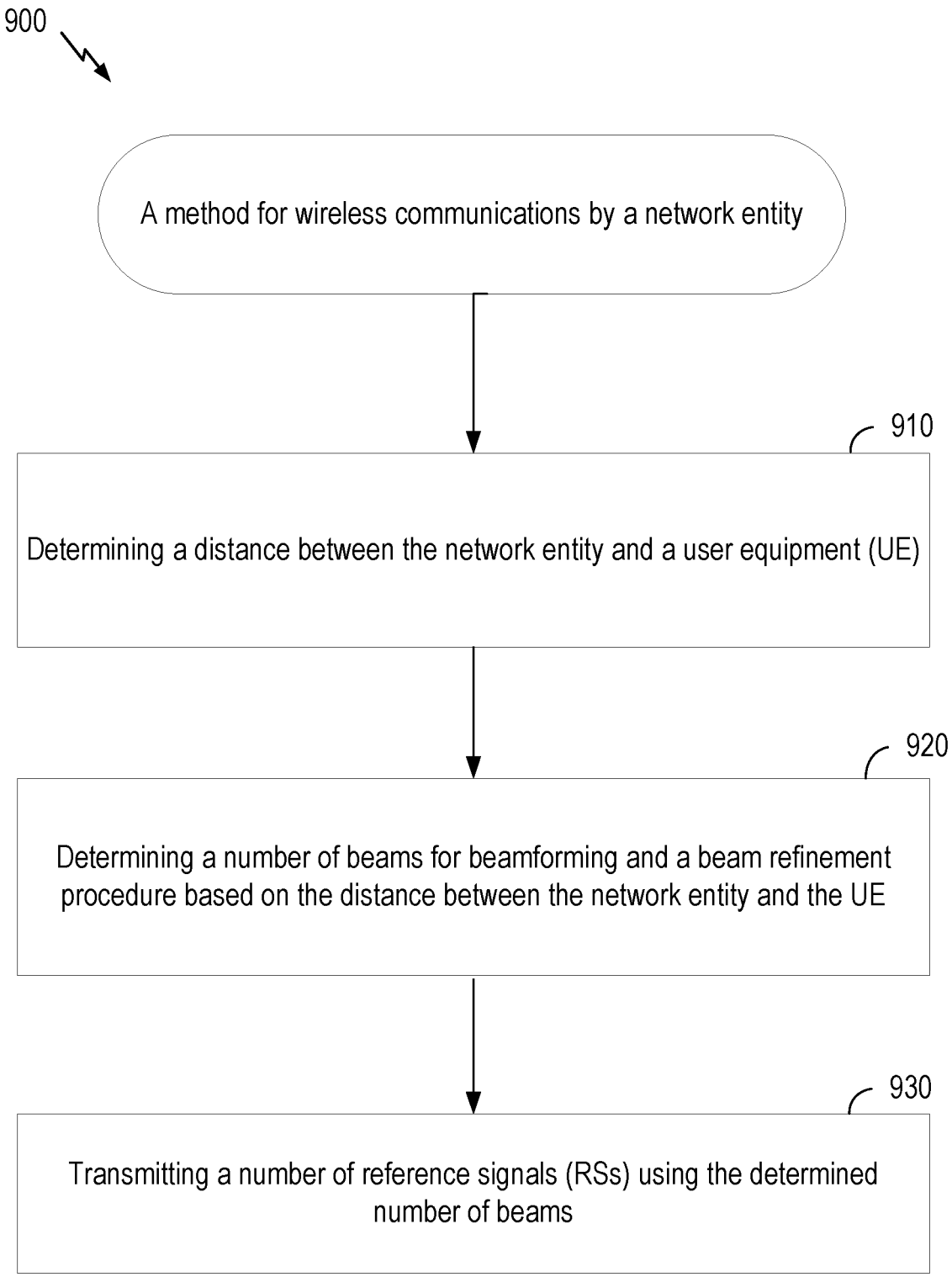
FIG. 9 is a flow diagram illustrating example operations for wireless communication by a network entity.
Figure 10:
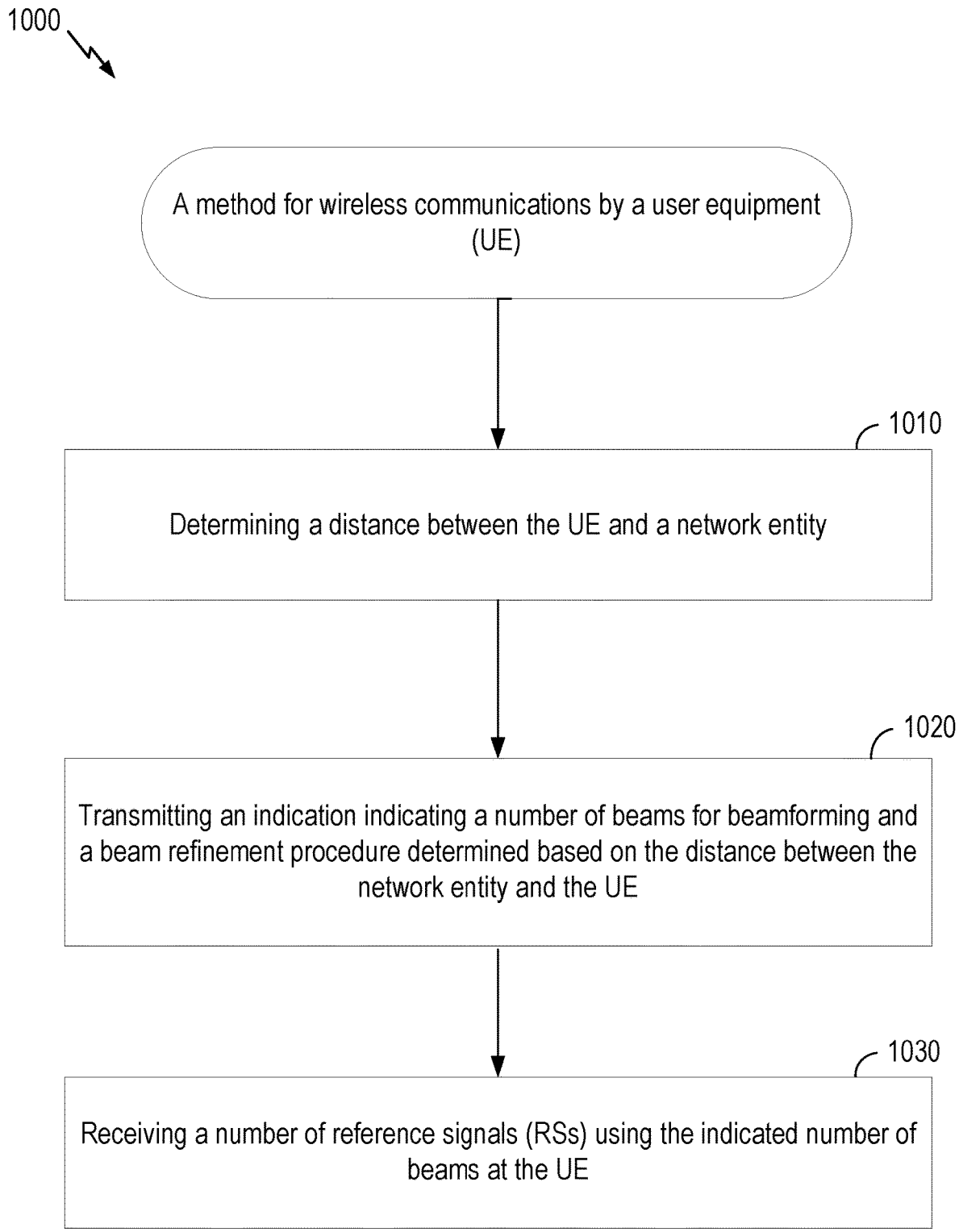
FIG. 10 is a flow diagram illustrating example operations for wireless communication by a UE.

Wireless communication network 100 further includes beam refinement component 198, which may be configured to perform operations 1000 of FIG. 10. Wireless communication network 100 includes beam refinement component 199, which may be configured to perform operations 900 of FIG. 9.

Figure 13:
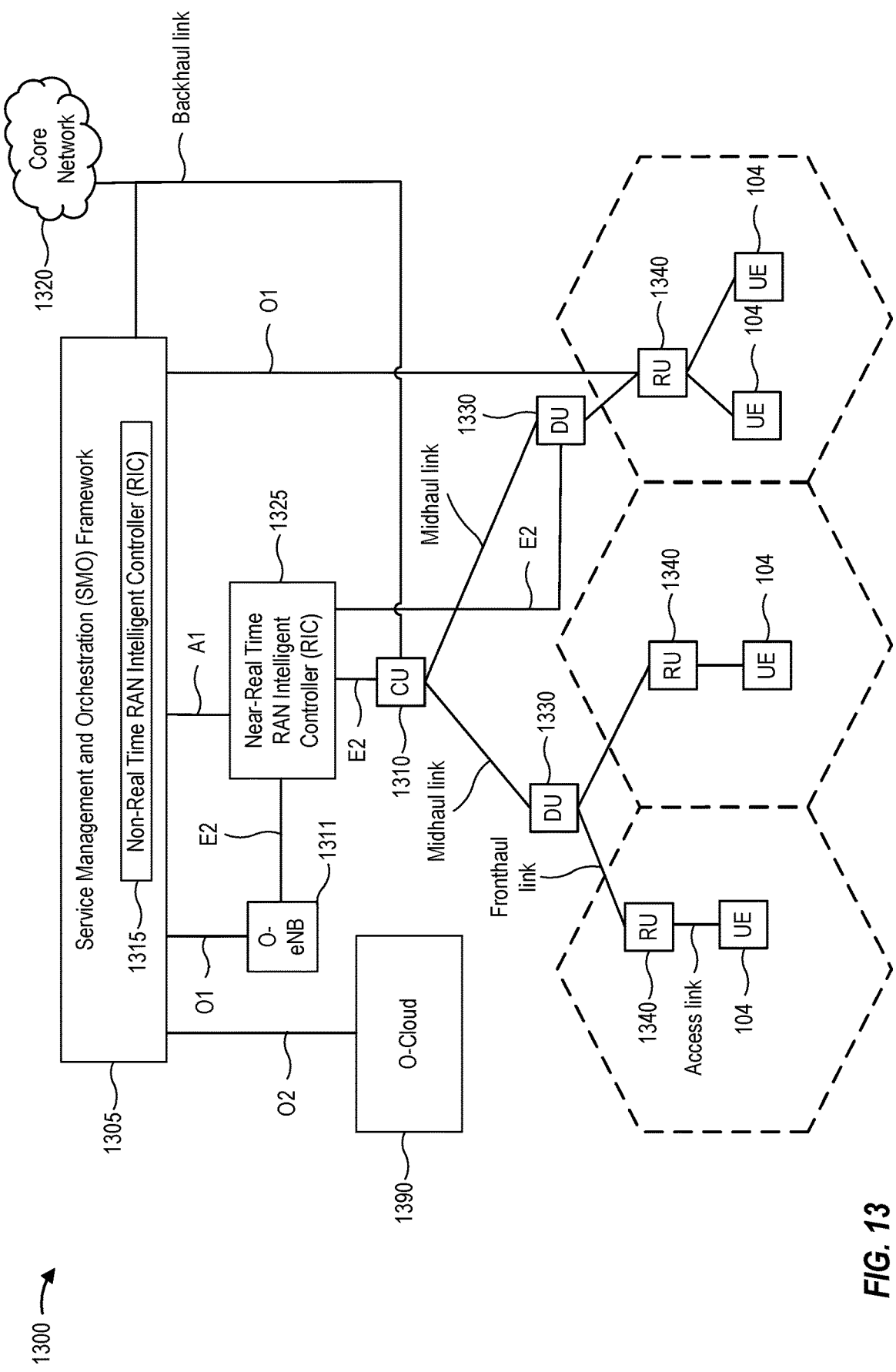
FIG. 13 depicts an example disaggregated BS architecture.

In various aspects, a BS 180 or a network node can be implemented as an aggregated BS, a disaggregated BS, an integrated access and backhaul (IAB) node, a relay node, or a sidelink node, to name a few examples. FIG. 13, discussed in further detail later in this disclosure, depicts an example disaggregated BS architecture.

Figure 2:
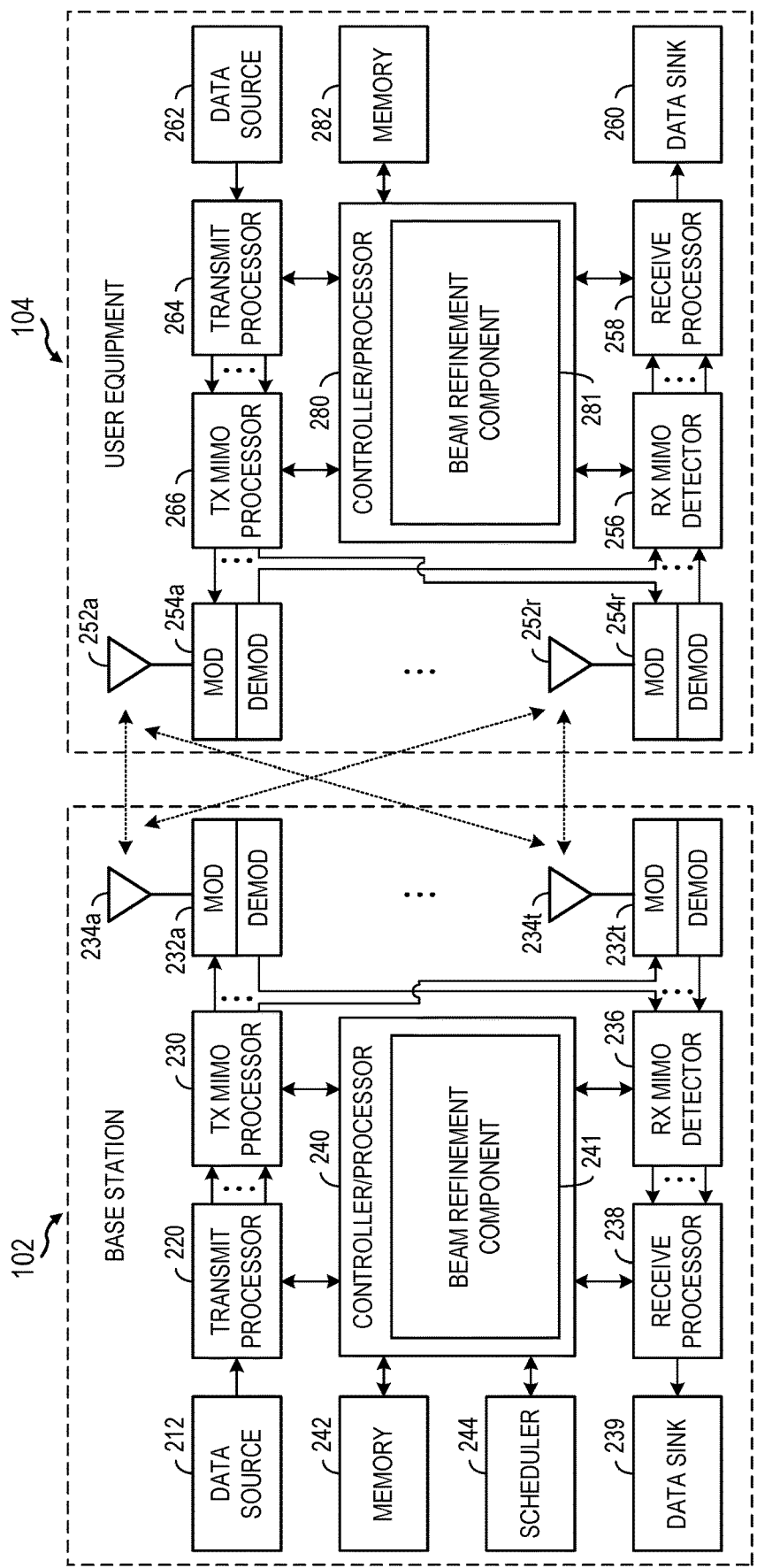
FIG. 2 is a block diagram conceptually illustrating aspects of an example base station (BS) and user equipment (UE).

FIG. 2 depicts aspects of an example BS 102 and a UE 104 (e.g., having a radar device). Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes beam refinement component 241, which may be representative of beam refinement component 199 of FIG. 1. Notably, while depicted as an aspect of controller/processor 240, beam refinement component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes beam refinement component 281, which may be representative of beam refinement component 198 of FIG. 1. Notably, while depicted as an aspect of controller/processor 280, beam refinement component 281 may be implemented additionally or alternatively in various other aspects of UE 104 in other implementations.

Figure 3:
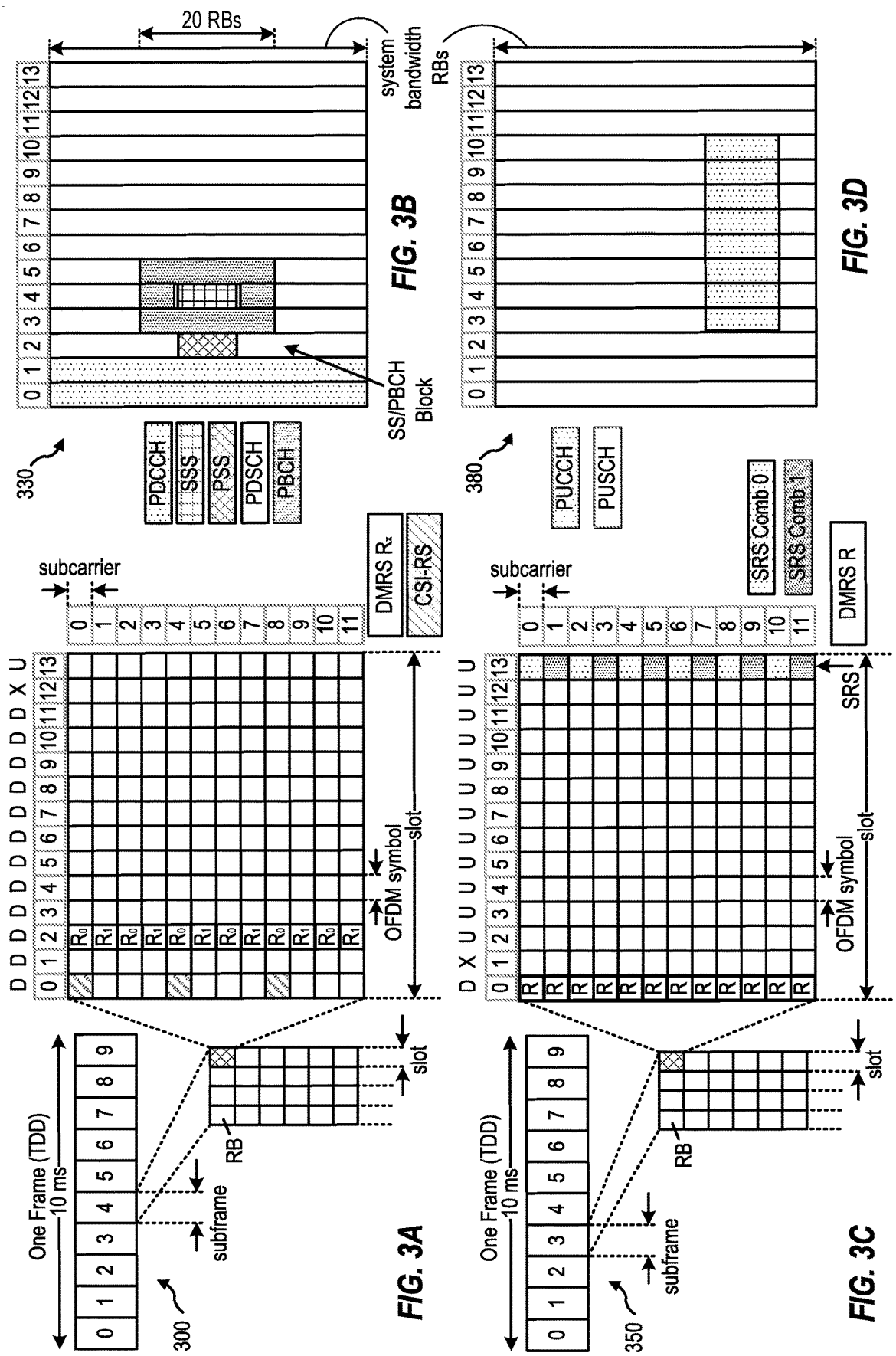
FIGS. 3A-3D depict various example aspects of data structures for a wireless communication network.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, FIGS. 3A-3D, and FIG. 13 are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5th generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., BS 180) configured to communicate using mmWave/near mmWave radio frequency bands may utilize beamforming (e.g., 182) with a user equipment (UE) (e.g., UE 104) to improve path loss and range.

Overview of Beamforming

Beamforming (which may also be referred to as spatial filtering) is used in wireless and millimeter wave (mmW) application space to increase directional antenna array gain. Devices using wireless communication technologies (e.g., portable electronic devices) may include multiple transmission and reception antennas or arrays that are configured to transmit and receive communications over a single spatial stream/beam. In one example, beamforming may be used at a transmitter device (e.g., a gNodeB (gNB)) to shape and/or steer an overall antenna beam in a direction of a target receiver device (e.g., a user equipment (UE)).

Overview of Multi-Transmission and Reception Point (mTRP) System

A multi-transmission and reception point (mTRP) system includes multiple transmission and reception points (TRPs), which are present in one or more cells. The one or more cells are managed by one or more network entities. The TRPs may include large area TRPs and small area TRPs. The large area TRPs may form a large transmission coverage using a high transmission power. The small area TRPs may form a smaller transmission coverage than the large area TRPs, using a lower transmission power than the large area TRPs.

Figure 4:
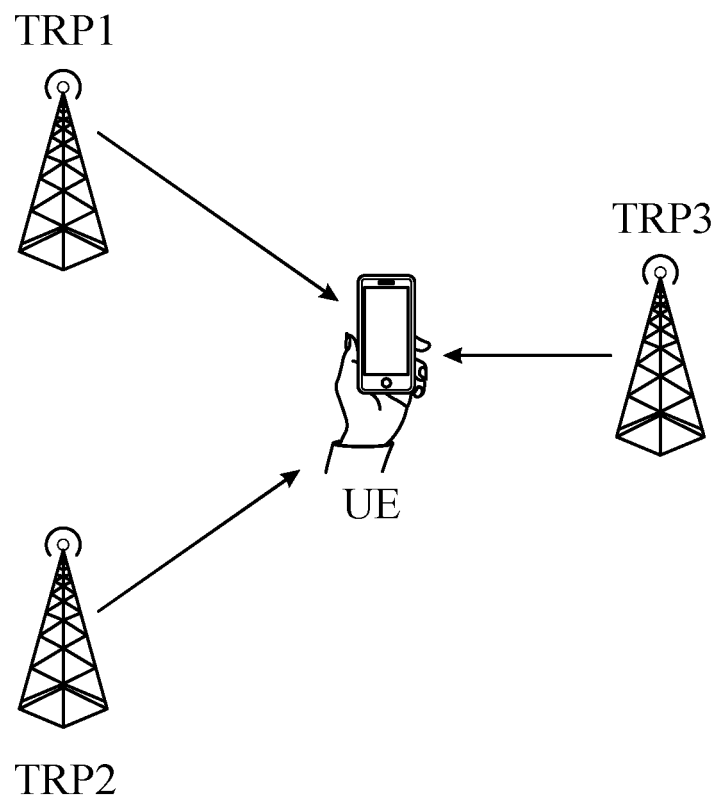
FIG. 4 illustrates example transmissions by transmission and reception points (TRPs) in a multi-TRP (mTRP) system.

The mTRP system includes the multiple TRPs to serve user equipments (UEs) to improve link reliability and capacity performance. For example, as illustrated in FIG. 4, a UE is served by a cluster of TRPs (e.g., TRP1, TRP2, and TRP3) at any given time to support increased mobile data traffic and enhance coverage. The clustering of TRPs may dynamically change over time to adapt to varying radio conditions, spectrum utilization, and UE mobility/Doppler conditions. Accordingly, the UE is served by different clusters of TRPs at different time periods. The different serving TRP clusters have different number of TRPs associated with same or different cells. The TRPs implement one or more macro-cells, small cells, pico-cells, or femto-cells, and may include remote radio heads, and relay nodes.

In multi-beam operation (e.g., involving frequency range 1 (FR1) and FR2 bands), more efficient uplink (UL)/downlink (DL) beam management allows for increased intra-cell and inter-cell mobility (e.g., L1 and/or L2-centric mobility)

and/or a larger number of transmission configuration indicator (TCI) states. For example, the TCI states may include the use of a common beam for data and control transmission and reception for UL and DL operations, a unified TCI framework for UL and DL beam indication, and enhanced signaling mechanisms to improve latency and efficiency (e.g., dynamic usage of control signaling).

In beamformed communication systems (e.g., millimeter wave (mmW) environment), a UE is connected to each TRP via a particular beam. In the mTRP system, preferred beam choices for mTRP transmissions and beam refinement (e.g., P2-based beam refinement procedure) are based on reference signal received power (RSRP) measurements. In some cases, the RSRP measurements may be narrowband estimates. Furthermore, a number of beams used in the P2-based beam refinement procedure is usually same for all TRPs operating within the mTRP system, as the same number of reference signals (RSs) are configured from each TRP to the UE.

Overview of Near-field and Far-field Systems

The present application relates to beam coordination in a near-field operation in a multi-transmission and reception point (mTRP) system. The difference between near-field and far-field operations typically relates to a distance separating transmit and receive devices.

Figure 5A:
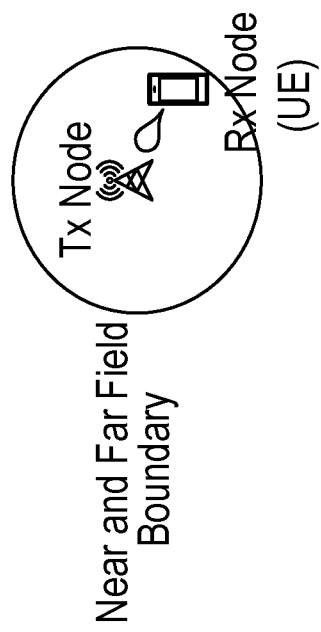
FIG. 5A illustrates example near-field operation.
Figure 5B:
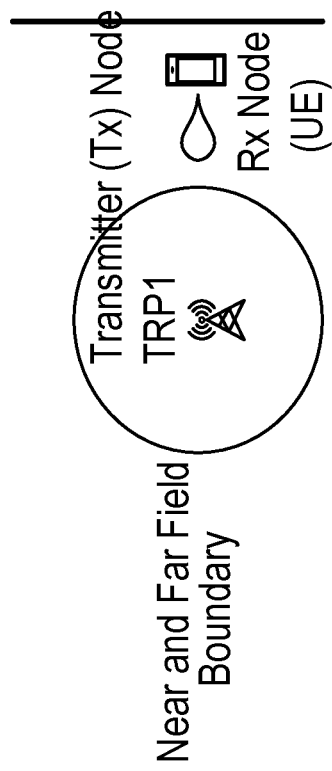
FIG. 5B illustrates example far-field operation.

As illustrated in FIG. 5A, when a transmit antenna (e.g., of a transmitter device/node such as a TRP1) with a largest dimension/aperture D transmits a signal of a wavelength $\lambda$, a receive antenna (e.g., of a receiver device/node such as a user equipment (UE)) is considered to be in a near-field if a distance separating the transmitting and receiving nodes is less than a Fraunhofer distance (defined as $2D^2/\lambda$) where D is equal to Nd (with d being an inter-antenna element spacing for a uniformly-spaced linear array of size N). As illustrated in FIG. 5B, a larger separation between the transmitting and receiving nodes places the receiver node in a far-field operation. The properties of transmitted electromagnetic waves change between the near- and far-fields.

A far-field distance may increase quadratically when there is an increase in array size/aperture. The far-field distance may increase linearly when there is an increase in a carrier frequency (e.g., for a same aperture). As a result, in some cases (e.g., for large arrays and higher carrier frequencies), the Fraunhofer distance at which the theoretical far-field operation begins can be very large.

In conventional systems, UEs usually operate in a far-field (e.g., with respect to a TRP) and not in near-field. In such systems, a far-field distance may be at least 5 to 10 meters (m). However, in some other systems (e.g., a 6th generation (6G) system), a near-field operation may become significant due to increased importance in higher carrier frequencies (FR4 and beyond) and the use of larger antenna arrays. In such systems, the near-field operation need not be near the TRP anymore. This is because, in such systems, a far-field distance may be quite large. For example, in some of these systems, the far-field distance is 20.48 m and 5.2 kilometer (km) with a 64×1 and 1024×1 array at 30 gigahertz (GHz), respectively. Also, for an aperture of 1 m, the far-field distance at 30 GHz and 120 GHz are approximately 200 m and 800 m, respectively. Example use-cases for the near-field operation in these systems include the use of assistive nodes (e.g., intelligent reflective surfaces (IRS), passive reflectarrays or repeater operations).

In some cases, when a UE gets closer to a TRP to be in a near-field, beamforming and beam refinement techniques associated with a conventional mTRP system start failing. This is because directional/hierarchical beamforming design for the UE implicitly assumes that the UE is operating in a far-field. Furthermore, in the near-field, electric field (E field) scales to $1/r^2$ or $1/r^3$ (e.g., depending on distance r between the UE and the TRP), which then requires modifications in terms of hybrid beamforming codebooks, TRP power, etc.

In the mTRP system, a UE can connect to multiple TRPs. Currently, as noted above, beamforming and beam refinement procedures assume far-field operation for all the TRPs. In some cases, thermal management of the TRPs is dependent on beam processing tasks of the TRPs. For example, when more beams are processed, power consumption is high, and with it the heat generated and possibility of overheating of the TRPs.

In the mTRP system, some TRPs may be at closer distances to the UE and some TRPs may be at far away distances from the UE (e.g., near-field vs. far-field). In such cases, after an initial acquisition of beams for use (e.g., the TRPs jointly transmitting data to the UE), a beam refinement procedure is asymmetric, since some TRPs encounter the UE in the near-field whereas the other TRPs encounter the UE in the far-field.

Figure 6:
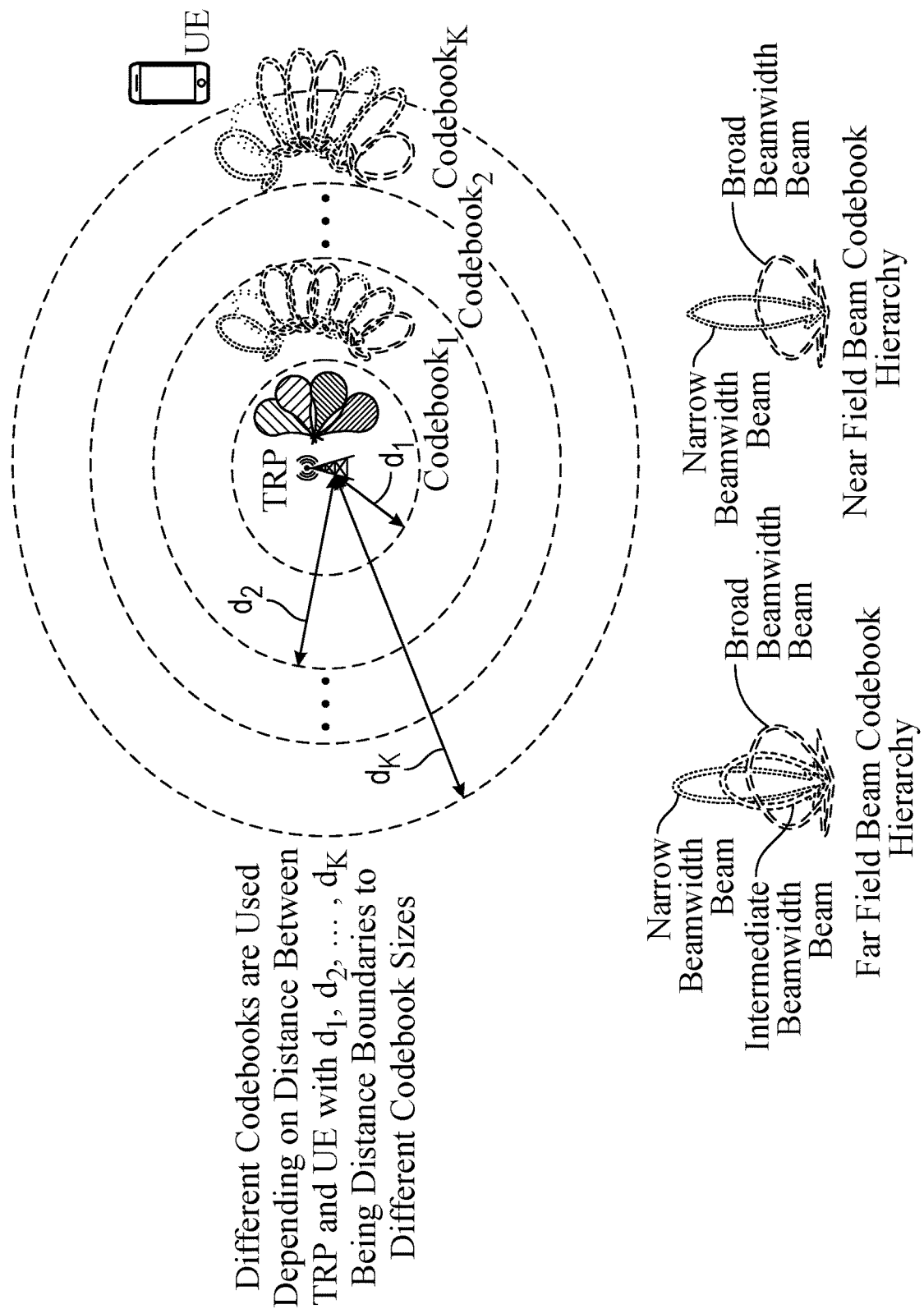
FIG. 6 illustrates example different beamforming codebooks for near-field users based on a distance between a UE and a TRP.

For example, for the beamforming and the beam refinement with the TRPs at the near-field, a lesser number of beams are needed, relative to a number of beams required for the beamforming and the beam refinement with the TRPs at the far-field (e.g., even though reference signal received powers (RSRPs) may be similar in both near-field and far-field scenarios). Furthermore, as illustrated in FIG. 6, since path losses are smaller at near-field distances (in relation to far-field distances), the use of a smaller number of beams (e.g., based on a hierarchical beamforming codebook used depending on a distance between the TRP and the UE) in every stage of hierarchical beamforming is more appropriate.

Accordingly, in above-noted cases, the beamforming and the beam refinement operation gets complex, since the same number of beams are not needed for the beamforming and the beam refinement for all the TRPs. This disclosure describes improved techniques for the beamforming and the beam refinement based on the near-field operation in the mTRP system.

Aspects Related to Beam Coordination in
Near-Field Operation with Multiple TRPs

Aspects of the present disclosure provide apparatuses, methods, processing systems, and computer-readable mediums for beam coordination in a near-field operation with multiple transmission and reception points (TRPs).

For example, each TRP in a multi-TRP (mTRP) system determines a distance-dependent number of beams (e.g., refinement beams) and reference signals (RSs) (e.g., based on a distance between a UE and a TRP), for use in joint communications with the UE. Accordingly, in such cases, some TRPs (e.g., at near-field) may use a lesser number of beams than other TRPs (e.g., at far-field) for beamforming and beam refinement. These TRPs may also coordinate and share information associated with the number of beams being used by them for the beamforming and the beam refinement with other TRPs. As a result, the techniques described herein may help improve thermal management at the TRPs (e.g., due to less heat dissipation as a lesser number of beams are used for the beamforming and the beam refinement).

The techniques for the beam coordination in the near-field operation in the mTRP system proposed herein may be understood with reference to the FIGS. 7A-10.

Figure 7A:
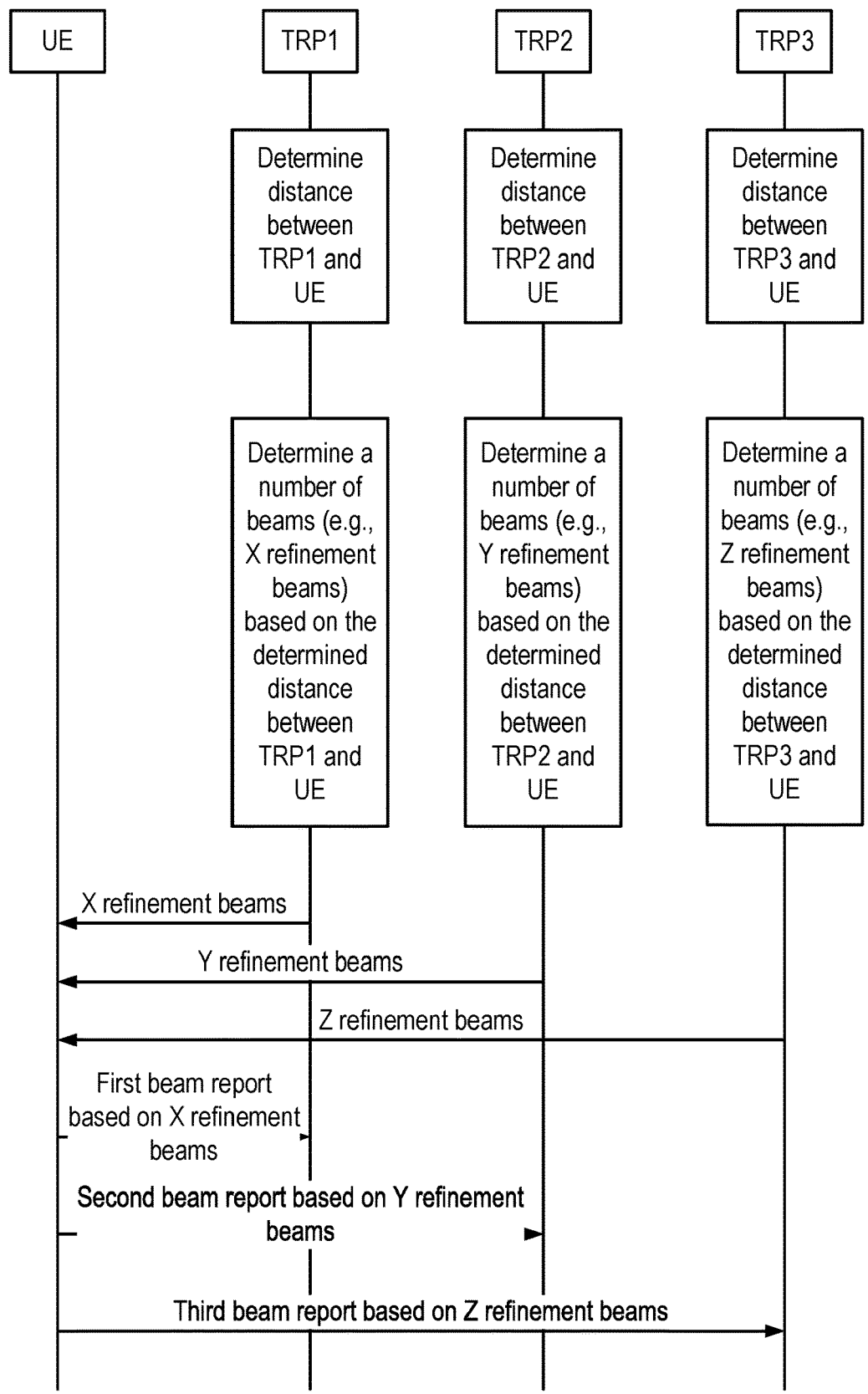
FIGS. 7A and 7B are call flow diagrams illustrating example communication between a UE and multiple TRPs.

As illustrated in FIG. 7A, each of a plurality of TRPs (e.g., TRP1, TRP2, and TRP3) determines a distance from a UE. For example, the TRP1 determines a distance (e.g., a first distance) between the TRP1 and the UE. The TRP2 determines a distance (e.g., a second distance) between the TRP2 and the UE. The TRP3 determines a distance (e.g., a third distance) between the TRP3 and the UE.

In one example, each TRP determines the distance between the TRP and the UE, based on one or more positioning reference signals (PRSs) or other reference signals transmitted from the TRP to the UE.

In another example, each TRP determines the distance between the TRP and the UE, based on a coarser path loss modeling. The coarser path loss modeling is based on a reference signal received power (RSRP) associated with an existing set of RSs transmitted from the TRP to the UE. The existing set of RSs may include synchronization signal blocks (SSBs). The existing set of RSs may also include channel state information (CSI)-RSs.

In another example, each TRP determines the distance between the TRP and the UE based on a machine-learning model (e.g., based on RSRP or other inputs from the TRP). The determined distance between the TRP and the UE can then be binarily classified as the near-field or the far-field.

In another example, each TRP may receive an estimate of a value of the distance between the TRP and the UE (e.g., from the UE). For example, the UE determines the distance between the TRP and the UE, and then sends an indication to the TRP indicating the value of the determined distance. The TRP then determines distance between the TRP and the UE, based on the received indication from the UE.

In certain aspects, each TRP determines a number of beams for beamforming and a beam refinement procedure, based on the determined distance between the TRP and the UE. For example, the TRP1 determines a number of beams (e.g., X number of refinement beams) for the beamforming and the beam refinement procedure, based on the determined first distance between the TRP1 and the UE. The TRP2 determines a number of beams (e.g., Y number of refinement beams) for the beamforming and the beam refinement procedure, based on the determined second distance between the TRP1 and the UE. The TRPS determines a number of beams (e.g., Z number of refinement beams) for the beamforming and the beam refinement procedure, based on the determined third distance between the TRP1 and the UE. In some cases, the number of beams for the beamforming and the beam refinement procedure may be less when the distance between the TRP and the UE is small, and the number of beams for the beamforming and the beam refinement procedure may be more when the distance between the TRP and the UE is large.

In certain aspects, each TRP transmits a number of RSs using the determined number of beams to the UE. For example, the TRP1 transmits X number of RSs using the X number of refinement beams to the UE. The TRP2 transmits Y number of RSs using the Y number of refinement beams to the UE. The TRP3 transmits Z number of RSs using the Z number of refinement beams to the UE.

In certain aspects, the UE transmits a beam report indicating one or more number of optimal beams (e.g., the best beams) detected by the UE across the TRPs, based on a TRP-specific threshold (e.g., a distance-determined threshold). For example, when the UE reports the top/best N beams across the TRPs, due to potential transmission power differences, reference signal received power (RSRP) strength at the UE does not reflect the ranking of the TRPs. In such cases, a per-TRP RSRP threshold may be used for L1 or L3 reports.

In one example, the UE transmits a first beam report to the TRP1 indicating one or more number of optimal beams, based on the X number of refinement beams and/or a TRP1-specific threshold. The TRP1-specific threshold is based on the distance between the TRP1 and the UE. In another example, the UE transmits a second beam report to the TRP2 indicating one or more optimal beams, based on the Y number of refinement beams and/or a TRP2-specific threshold. The TRP2-specific threshold is based on the distance between the TRP2 and the UE. In another example, the UE transmits a third beam report to the TRP3 indicating one or more optimal beams, based on the Z number of refinement beams and/or a TRP3-specific threshold. The TRP3-specific threshold is based on the distance between the TRP3 and the UE.

The TRP-specific threshold is a signal strength threshold. In one example, the signal strength threshold may correspond to signal to noise ratio (SNR). In another example, the signal strength threshold may correspond to signal to interference and noise ratio (SINR). In another example, the signal strength threshold may correspond to reference signal received power (RSRP). In another example, the signal strength threshold may correspond to reference signal received quality (RSRQ). In another example, the signal strength threshold may correspond to reference signal strength indicator (RSSI).

Figure 7B:
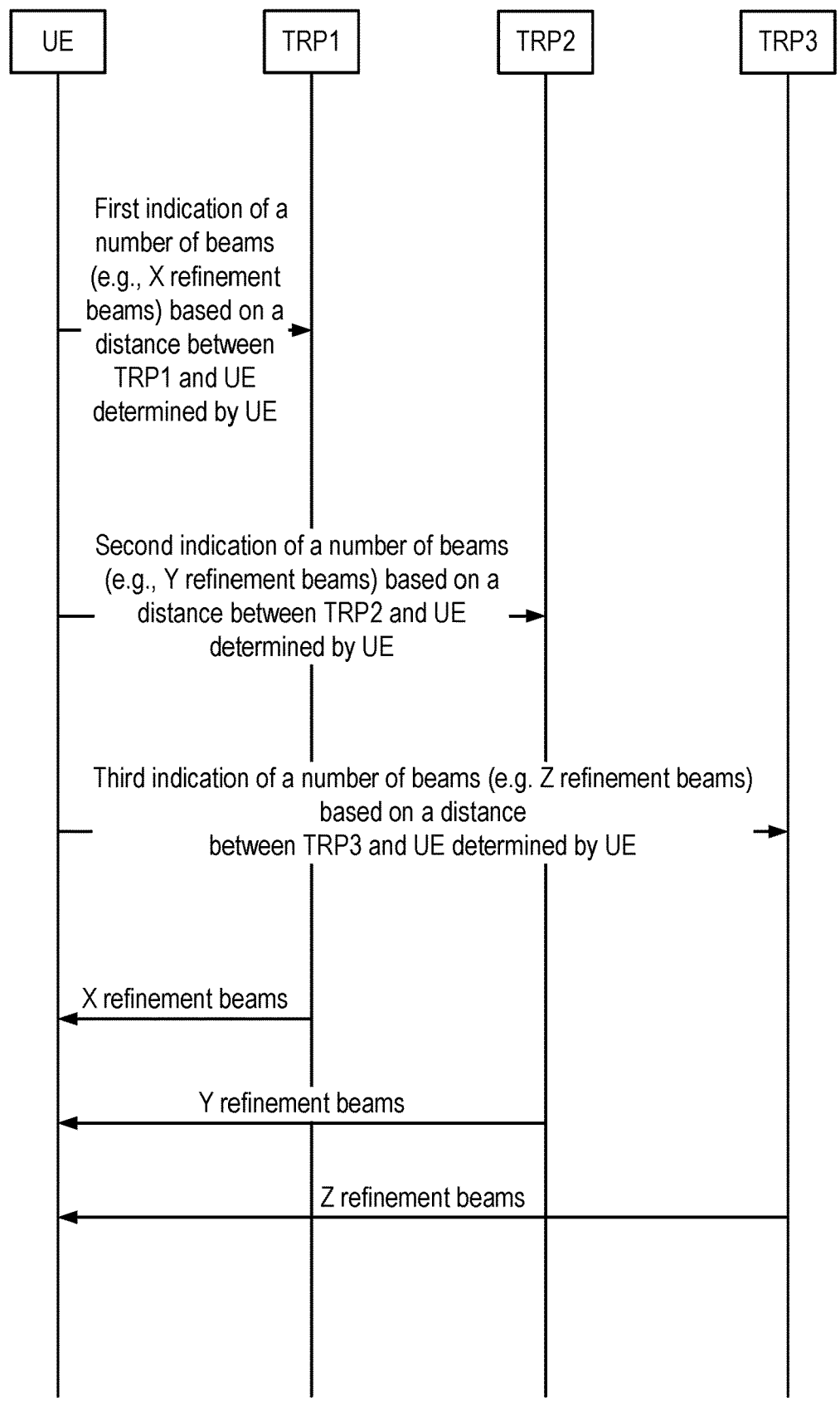

In certain aspects, as illustrated in FIG. 7B, the UE may determine a number of beams (e.g., refinement beams) for beamforming and a beam refinement procedure, based on the distance between the TRP and the UE (which is determined by the UE). The UE then sends an indication indicating the determined number of beams to each TRP.

For example, the UE sends an indication (e.g., a first indication) to the TRP1 indicating X number of refinement beams for the beamforming and the beam refinement procedure, based on a distance between the TRP1 and the UE (e.g., that is determined by the UE). The UE also sends an indication (e.g., a second indication) to the TRP2 indicating Y number of refinement beams for the beamforming and the beam refinement procedure, based on a distance between the TRP2 and the UE (e.g., that is determined by the UE). The UE sends an indication (e.g., a third indication) to the TRP3 indicating Z number of refinement beams for the beamforming and the beam refinement procedure, based on a distance between the TRP3 and the UE (e.g., that is determined by the UE).

After receiving the indication from the UE, each TRP transmits a number of RSs using the indicated number of beams to the UE. For example, the TRP1 transmits X number of RSs using the X number of refinement beams to the UE. The TRP2 transmits Y number of RSs using the Y number of refinement beams to the UE. The TRP3 transmits Z number of RSs using the Z number of refinement beams to the UE.

Figure 8:
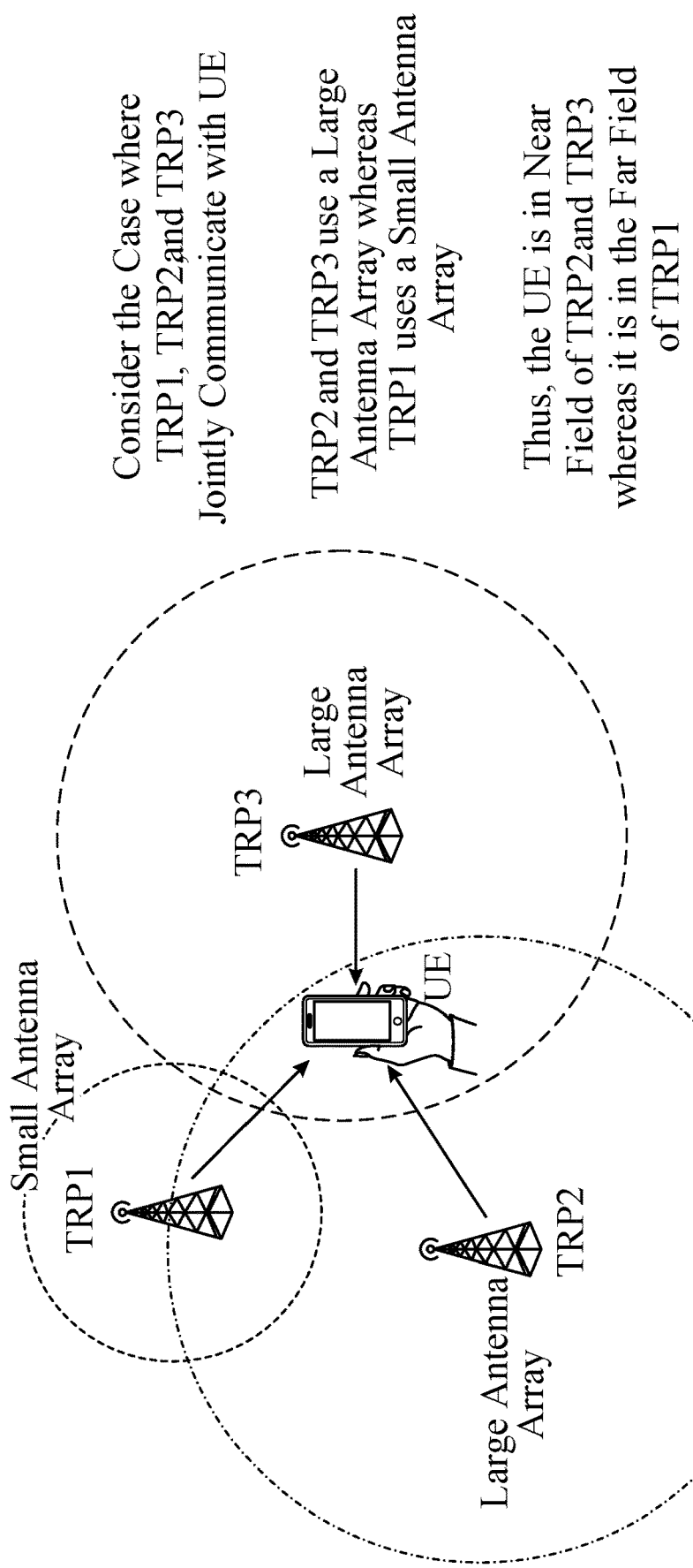
FIG. 8 illustrates example TRPs having an antenna array of different sizes jointly communicating with a UE.

In certain aspects, M transmission configuration indicator (TCI) states may be chosen for joint transmission/reception (e.g., frequency division multiplexing (FDM), space division multiplexing (SDM), and/or time division multiplexing (TDM)) in context of reliability or higher rank schemes. For example, as illustrated in FIG. 8, the UE (which is at a mixed setting, i.e., near-field to TRP2 and TRP3 and far-field to TRP1) may see a large inter-beam interference since a wide beamwidth beam is used by a TRP at near-field to the UE.

In such cases, a distance-determined restriction of allowed joint TCI states may be necessary. For example, the UE may coordinate beams across each TRP participating in the mTRP communication with the UE based on their distance from the UE and a distance-determined restriction of allowed beams across the plurality of TRPs.

In certain aspects, each TRP maps a beamwidth of a beam used at the UE to the number of RSs allocated for the beam refinement procedure. For example, the TRP1 may implicitly map the beamwidth of the beam used at the UE (e.g., for receiving) to the number of RSs allocated for the beam refinement procedure from the TRP1. In one example, the beamwidth is more than a first threshold when the number of beams are less than a second threshold (e.g., lesser the number of beams, larger the beamwidth). In another example, the beamwidth is less than the first threshold when the number of beams are more than the second threshold (e.g., more the number of beams, smaller the beamwidth).

In certain aspects, each TRP allocates UE-specific RS resources without receiving a request from the UE for the UE-specific RS resources. That is, the techniques described herein can be made automatic by allocation of the UE-specific RS resources without having to wait for the UE to request specific number of RS resources.

In some cases, based on the techniques described herein, the TRP may reduce an array gain for shorter distances between the TRP and the UE, without any link budget concerns or automatic gain control (AGC) saturation.

FIG. 9 illustrates example operations 900 for wireless communication. The operations 900 may be performed, for example, by a network entity (e.g., such as BS 102 in wireless communication network 100 of FIG. 1). The operations 900 may be implemented as software components that are executed and run on one or more processors (e.g., controller/processor 240 of FIG. 2). Further, transmission and reception of signals by the network entity in the operations 900 may be enabled, for example, by one or more antennas (e.g., antennas 234 of FIG. 2). In certain aspects, the transmission and/or reception of signals by the network entity may be implemented via a bus interface of one or more processors (e.g., the controller/processor 240) obtaining and/or outputting signals.

The operations 900 begin, at 910, by determining a distance between the network entity and a UE. For example, the network entity may determine the distance between the network entity and the UE, using a processor of BS 102 shown in FIG. 1 or FIG. 2 and/or of the apparatus shown in FIG. 11. The network entity is a TRP of a plurality of TRPs participating in an mTRP communication with the UE.

At 920, the network entity determines a number of beams for beamforming and a beam refinement procedure based on the distance between the network entity and the UE. For example, the network entity may determine the number of beams for the beamforming and the beam refinement procedure, using a processor of BS 102 shown in FIG. 1 or FIG. 2 and/or of the apparatus shown in FIG. 11.

At 930, the network entity transmits a number of RSs using the determined number of beams. For example, the network entity may transmit the number of RSs using antenna(s) and/or transmitter/transceiver components of BS 102 shown in FIG. 1 or FIG. 2 and/or of the apparatus shown in FIG. 11.

FIG. 10 illustrates example operations 1000 for wireless communication. The operations 1000 may be performed, for example, by a UE (e.g., such as UE 104 in wireless communication network 100 of FIG. 1). The operations 1000 may be implemented as software components that are executed and run on one or more processors (e.g., controller/processor 280 of FIG. 2). Further, transmission and reception of signals by the UE in the operations 1000 may be enabled, for example, by one or more antennas (e.g., antennas 252 of FIG. 2). In certain aspects, the transmission and/or reception of signals by the UE may be implemented via a bus interface of one or more processors (e.g., the controller/processor 280) obtaining and/or outputting signals.

The operations 1000 begin, at 1010, by determining a distance between the UE and a network entity. For example, the UE may determine the distance between the UE and the network entity using a processor of UE 104 shown in FIG. 1 or FIG. 2 and/or of the apparatus shown in FIG. 12. The network entity is a TRP of a plurality of TRPs participating in an mTRP communication with the UE.

At 1020, the UE transmits an indication indicating a number of beams for beamforming and a beam refinement procedure determined based on the distance between the network entity and the UE. For example, the UE may transmit the indication using antenna(s) and/or transmitter/transceiver components of UE 104 shown in FIG. 1 or FIG. 2 and/or of the apparatus shown in FIG. 12.

At 1030, the UE receives a number of RSs using the indicated number of beams at the UE. For example, the UE may receive the number of RSs using antenna(s) and/or receiver/transceiver components of UE 104 shown in FIG. 1 or FIG. 2 and/or of the apparatus shown in FIG. 12.

Example Wireless Communication Devices

Figure 11:
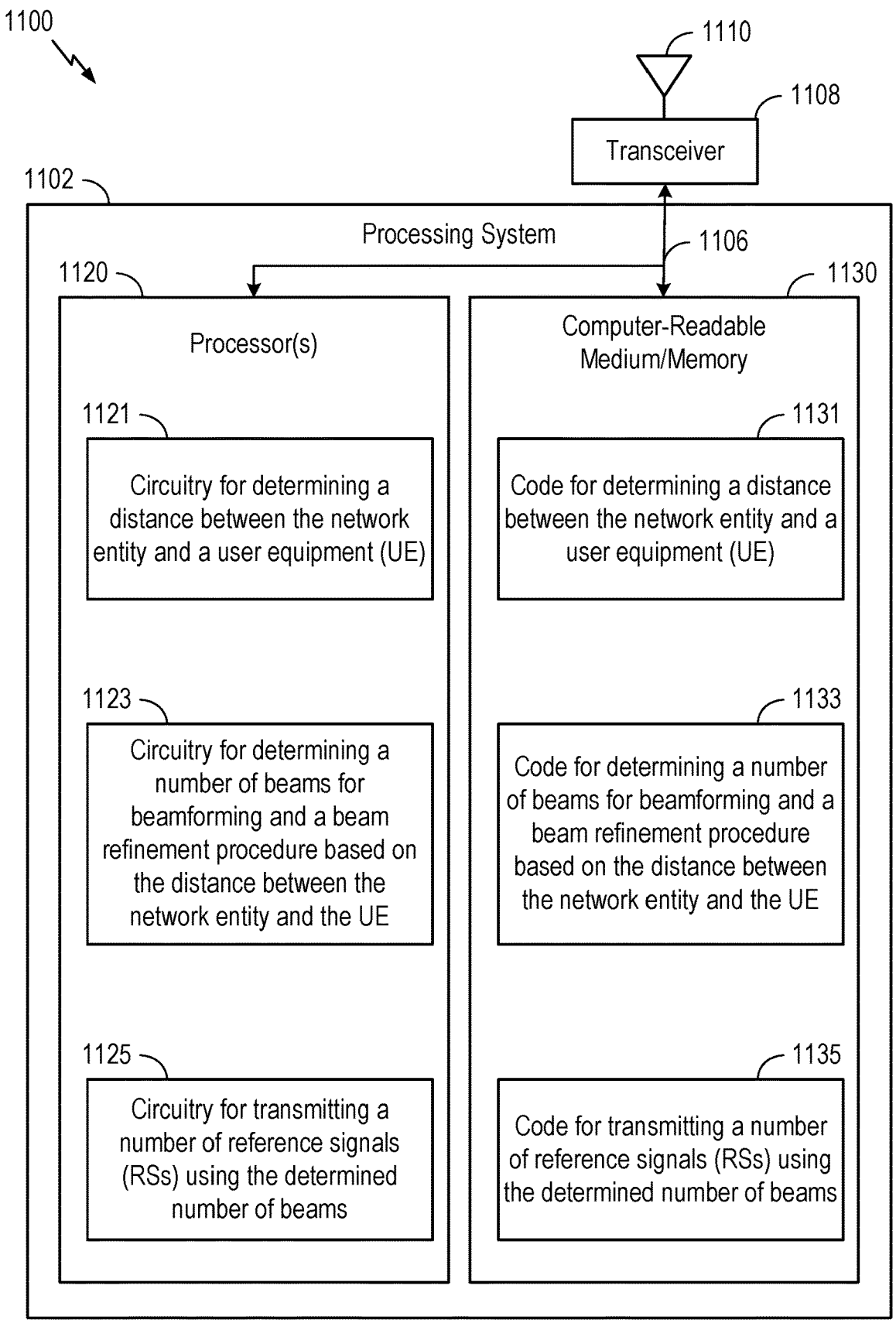
FIG. 11 depicts aspects of an example communications device.

FIG. 11 depicts an example communications device 1100 that includes various components operable, configured, or adapted to perform operations for the techniques disclosed herein, such as the operations depicted and described with respect to FIG. 9. In some examples, communication device 1100 may be a BS 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIG. 9, or other operations for performing the various techniques discussed herein.

In the depicted example, computer-readable medium/memory 1130 stores code 1131 for determining a distance between the network entity and a user equipment (UE), code for 1133 determining a number of beams for beamforming and a beam refinement procedure based on the distance between the network entity and the UE, and code 1135 for transmitting a number of reference signals (RSs) using the determined number of beams.

In the depicted example, the one or more processors 1120 include circuitry configured to implement the code stored in the computer-readable medium/memory 1130, including circuitry 1121 for determining a distance between the network entity and a UE, circuitry 1123 for determining a number of beams for beamforming and a beam refinement procedure based on the distance between the network entity and the UE, and circuitry 1125 for transmitting a number of RSs using the determined number of beams.

Various components of communications device 1100 may provide means for performing the methods described herein, including with respect to FIG. 9.

In some examples, means for transmitting or sending (or means for outputting for transmission) may include the transceivers 232 and/or antenna(s) 234 of the BS 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the BS illustrated in FIG. 2 and/or transceiver 1108 and antenna 1110 of the communication device 1100 in FIG. 11.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive multiple input multiple output (MIMO) processors, modulators, demodulators, and the like, such as depicted in the examples in FIG. 2.

In some examples, means for determining a distance between the network entity and a UE, means for determining a number of beams for beamforming and a beam refinement procedure based on the distance between the network entity and the UE, and means for transmitting a number of RSs using the determined number of beams, may include various processing system components, such as: the one or more processors 1120 in FIG. 11, or aspects of the BS 102 depicted in FIG. 2, including receive processor 238, transmit processor 220, TX MIMO processor 230, and/or controller/processor 240 (including beam refinement component 241).

Notably, FIG. 11 is an example, and many other examples and configurations of communication device 1100 are possible.

Figure 12:
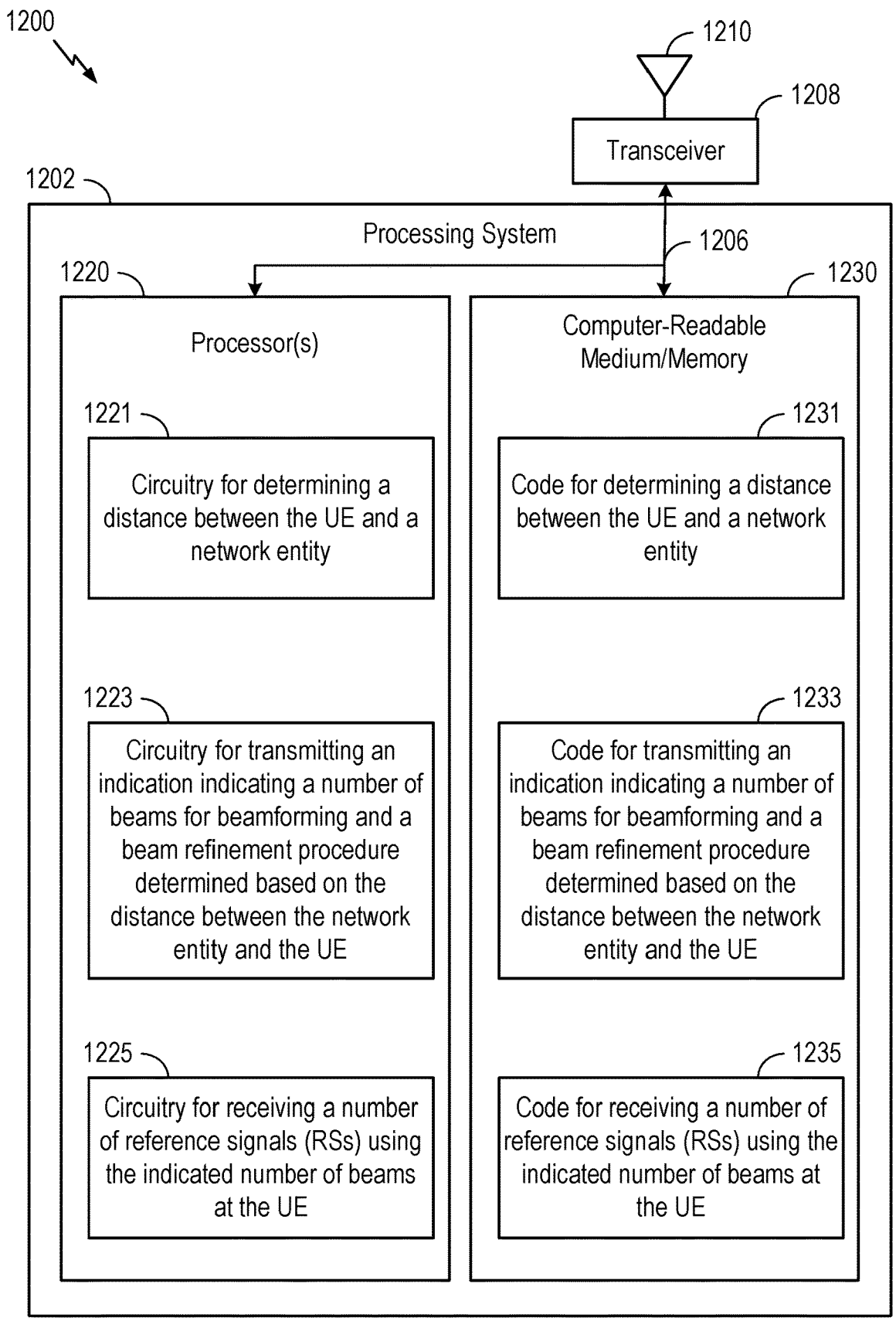
FIG. 12 depicts aspects of an example communications device.

FIG. 12 depicts an example communications device 1200 that includes various components operable, configured, or adapted to perform operations for the techniques disclosed herein, such as the operations depicted and described with respect to FIG. 10. In some examples, communication device 1200 may be a UE 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 10, or other operations for performing the various techniques discussed herein.

In the depicted example, computer-readable medium/memory 1230 stores code 1231 for determining a distance between the UE and a network entity, code 1233 for transmitting an indication indicating a number of beams for beamforming and a beam refinement procedure determined based on the distance between the network entity and the UE, and code 1235 for receiving a number of RSs using the indicated number of beams at the UE.

In the depicted example, the one or more processors 1220 include circuitry configured to implement the code stored in the computer-readable medium/memory 1230, including circuitry 1221 for determining a distance between the UE and a network entity, circuitry 1223 for transmitting an indication indicating a number of beams for beamforming and a beam refinement procedure determined based on the distance between the network entity and the UE, and circuitry 1225 for receiving a number of RSs using the indicated number of beams at the UE.

Various components of communications device 1200 may provide means for performing the methods described herein, including with respect to FIG. 10.

In some examples, means for transmitting or sending (or means for outputting for transmission) may include the transceivers 254 and/or antenna(s) 252 of the UE 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the UE 104 illustrated in FIG. 2 and/or transceiver 1208 and antenna 1210 of the communication device 1200 in FIG. 12.

In some examples, means for determining a distance between the UE and a network entity, means for transmitting an indication indicating a number of beams for beamforming and a beam refinement procedure determined based on the distance between the network entity and the UE, and means for receiving a number of RSs using the indicated number of beams at the UE, may include various processing system components, such as: the one or more processors 1220 in FIG. 12, or aspects of the UE 104 depicted in FIG. 2, including receive processor 258, transmit processor 264, TX MIMO processor 266, and/or controller/processor 280 (including beam refinement component 281).

Notably, FIG. 12 is an example, and many other examples and configurations of communication device 1200 are possible.

Example Clauses

Implementation examples are described in the following numbered clauses:

Clause 1: A method for wireless communications by a network entity, comprising: determining a distance between the network entity and a user equipment (UE); determining a number of beams for beamforming and a beam refinement procedure based on the distance between the network entity and the UE; and transmitting a number of reference signals (RSs) using the determined number of beams.

Clause 2: The method alone or in combination with the first clause, wherein the network entity is a transmission and reception point (TRP) of a plurality of TRPs participating in a multi-TRP (mTRP) communication with the UE.

Clause 3: The method alone or in combination with the first and second clauses, further comprising transmitting one or more positioning reference signals (PRSs) or other RSs, and wherein the determining the distance comprises determining the distance based on the one or more PRSs or other RSs.

Clause 4: The method alone or in combination with the first and second clauses, wherein the determining the distance comprises determining the distance based on a reference signal received power (RSRP) associated with a set of reference signals (RSs) transmitted to the UE, wherein the set of RSs comprises at least one of: a synchronization signal block (SSB) or a channel state information (CSI)-RS.

Clause 5: The method alone or in combination with the first and second clauses, wherein the determining the distance comprises determining the distance based on a machine learning model.

Clause 6: The method alone or in combination with the first and second clauses, wherein the determining the distance comprises receiving a value of the distance between the network entity and the UE from the UE.

Clause 7: The method alone or in combination with the sixth clause, wherein the determining the number of beams comprises receiving the number of the beams based on the distance between the network entity and the UE.

Clause 8: The method alone or in combination with the first clause, further comprising receiving a beam report indicating one or more optimal beams detected by the UE based on a network entity-specific threshold.

Clause 9: The method alone or in combination with the eighth clause, wherein the network entity-specific threshold is a signal strength threshold.

Clause 10: The method alone or in combination with the eighth clause, wherein the network entity-specific threshold is a signal strength threshold.

Clause 11: The method alone or in combination with the eighth clause, wherein the network entity-specific threshold is based on the distance between the network entity and the UE.

Clause 12: The method alone or in combination with the first clause, further comprising mapping a beamwidth of a beam used at the UE to the number of RSs allocated for the beam refinement procedure.

Clause 13: The method alone or in combination with the twelfth clause, wherein the beamwidth is more than a first threshold when the number of beams are less than a second threshold, and the beamwidth is less than the first threshold when the number of beams are more than the second threshold.

Clause 14: The method alone or in combination with the first clause, further comprising allocating UE-specific RS resources without receiving a request from the UE for the UE-specific RS resources.

Clause 15: A method for wireless communications by a user equipment (UE), comprising: determining a distance between the UE and a network entity; transmitting an indication indicating a number of beams for beamforming and a beam refinement procedure determined based on the distance between the network entity and the UE; and receiving a number of reference signals (RSs) using the indicated number of beams at the UE.

Clause 16: The method alone or in combination with the fifteenth clause, wherein the network entity is a transmission and reception point (TRP) of a plurality of TRPs participating in a multi-TRP (mTRP) communication with the UE.

Clause 17: The method alone or in combination with the fifteenth and sixteenth clauses, further comprising transmitting a beam report indicating one or more optimal beams detected by the UE based on a network entity-specific threshold.

Clause 18: The method alone or in combination with the seventeenth clause, wherein the network entity-specific threshold is a signal strength threshold.

Clause 19: The method alone or in combination with the seventeenth clause, wherein the network entity-specific threshold is based on the distance between the network entity and the UE.

Clause 20: An apparatus, comprising: a memory comprising executable instructions; and one or more processors configured to execute the executable instructions and cause the apparatus to perform a method in accordance with any one of Clauses 1-19.

Clause 21: An apparatus, comprising means for performing a method in accordance with any one of Clauses 1-19.

Clause 22: A non-transitory computer-readable medium comprising executable instructions that, when executed by one or more processors of an apparatus, cause the apparatus to perform a method in accordance with any one of Clauses 1-19.

Clause 23: A computer program product embodied on a computer-readable storage medium comprising code for performing a method in accordance with any one of Clauses 1-19.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 13 depicts an example disaggregated base station 1300 architecture. The disaggregated base station 1300 architecture may include one or more central units (CUs) 1310 that can communicate directly with a core network 1320 via a backhaul link, or indirectly with the core network 1320 through one or more disaggregated base station units (such as a Near-Real Time (Near-RT) RAN Intelligent Controller (RIC) 1325 via an E2 link, or a Non-Real Time (Non-RT) RIC 1315 associated with a Service Management and Orchestration (SMO) Framework 1305, or both). A CU 1310 may communicate with one or more distributed units (DUs) 1330 via respective midhaul links, such as an F1 interface. The DUs 1330 may communicate with one or more radio units (RUs) 1340 via respective fronthaul links. The RUs 1340 may communicate with respective UEs 104 via one or more radio frequency (RF) access links. In some implementations, the UE 104 may be simultaneously served by multiple RUs 1340.

Each of the units, i.e., the CUs 1310, the DUs 1330, the RUs 1340, as well as the Near-RT RICs 1325, the Non-RT RICs 1315 and the SMO Framework 1305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1310. The CU 1310 may be configured to handle user plane functionality (i.e., Central Unit-User Plane (CU-UP)), control plane functionality (i.e., Central Unit-Control Plane (CU-CP)), or a combination thereof. In some implementations, the CU 1310 can be logically split into one or more CU-UP units and one or more CU-CP units. The CU-UP unit can communicate bidirectionally with the CU-CP unit via an interface, such as the E1 interface when implemented in an O-RAN configuration. The CU 1310 can be implemented to communicate with the DU 1330, as necessary, for network control and signaling.

The DU 1330 may correspond to a logical unit that includes one or more base station functions to control the operation of one or more RUs 1340. In some aspects, the DU 1330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1330 may further host one or more low PHY layers. Each layer (or module) can be implemented with an interface configured to communicate signals with other layers (and modules) hosted by the DU 1330, or with the control functions hosted by the CU 1310.

Lower-layer functionality can be implemented by one or more RUs 1340. In some deployments, an RU 1340, controlled by a DU 1330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1340 can be implemented to handle over the air (OTA) communication with one or more UEs 104. In some implementations, real-time and non-real-time aspects of control and user plane communication with the RU(s) 1340 can be controlled by the corresponding DU 1330. In some scenarios, this configuration can enable the DU(s) 1330 and the CU 1310 to be implemented in a cloud-based RAN architecture, such as a vRAN architecture.

The SMO Framework 1305 may be configured to support RAN deployment and provisioning of non-virtualized and virtualized network elements. For non-virtualized network elements, the SMO Framework 1305 may be configured to support the deployment of dedicated physical resources for RAN coverage requirements which may be managed via an operations and maintenance interface (such as an O1 interface). For virtualized network elements, the SMO Framework 1305 may be configured to interact with a cloud computing platform (such as an open cloud (O-Cloud) 1390) to perform network element life cycle management (such as to instantiate virtualized network elements) via a cloud computing platform interface (such as an O2 interface). Such virtualized network elements can include, but are not limited to, CUs 1310, DUs 1330, RUs 1340 and Near-RT RICs 1325. In some implementations, the SMO Framework 1305 can communicate with a hardware aspect of a 4G RAN, such as an open eNB (O-eNB) 1311, via an O1 interface. Additionally, in some implementations, the SMO Framework 1305 can communicate directly with one or more RUs 1340 via an O1 interface. The SMO Framework 1305 also may include a Non-RT RIC 1315 configured to support functionality of the SMO Framework 1305.

The Non-RT RIC 1315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC X25. The Non-RT RIC 1315 may be coupled to or communicate with (such as via an A1 interface) the Near-RT RIC 1325. The Near-RT RIC 1325 may be configured to include a logical function that enables near-real-time control and optimization of RAN elements and resources via data collection and actions over an interface (such as via an E2 interface) connecting one or more CUs 1310, one or more DUs 1330, or both, as well as an O-eNB, with the Near-RT RIC 1325.

In some implementations, to generate AI/ML models to be deployed in the Near-RT RIC 1325, the Non-RT RIC 1315 may receive parameters or external enrichment information from external servers. Such information may be utilized by the Near-RT RIC 1325 and may be received at the SMO Framework 1305 or the Non-RT RIC 1315 from non-network data sources or from network functions. In some examples, the Non-RT RIC 1315 or the Near-RT RIC 1325 may be configured to tune RAN behavior or performance. For example, the Non-RT RIC 1315 may monitor long-term trends and patterns for performance and employ AI/ML models to perform corrective actions through the SMO Framework 1305 (such as reconfiguration via O1) or via creation of RAN management policies (such as A1 policies).

Example Machine Learning

Aspects of the present disclosure relate to machine learning based techniques for determining a distance between a network entity and a user equipment (UE). The network entity is a transmission and reception point (TRP) of a plurality of TRPs participating in a multi-TRP (mTRP) communication with the UE.

In some examples, machine learning involves training a model, such as a predictive model. The model may be used to predict best actions based on a current state. The model may be used to perform the prediction(s) discussed above and/or other factors. The model may be trained based on training data (e.g., training information), which may include channel conditions parameters, states, actions, and associated rewards. The model may be trained and/or refined on-line. For example, environmental change can motivate on-line training to fine tune a machine learning mode. Various training samples across nodes may be used in a single link or multi-link system.

A networked environment may include a user equipment (UE), a base station (BS), a training system, and a training repository, communicatively connected via a network(s). The network(s) may include a wireless network, which may be a 5th generation (5G) new radio (NR) network and/or a long term evolution (LTE) network. The training system and the training repository may be implemented on the UE, the BS, as separate components, and/or on any number of computing systems, either as one or more standalone systems or in a distributed environment.

The training system includes a predictive model training manager that uses training data to generate the predictive model for data transmission configuration. The predictive model may be determined based, at least in part, on the information in the training repository.

The machine learning model may be trained in a simulated communication environment (e.g., in field testing, drive testing) prior to deployment. The training information can be stored in the training repository. After deployment, the training repository can be updated to include feedback associated with the machine learning model. The training repository can be updated with information from BSs and/or UEs in the environment, for example, based on learned experience by those BSs and UEs.

The predictive model training manager may use the information in the training repository to determine the predictive model (e.g., algorithm) used for determining a data transmission configuration. The predictive model training manager may use various different types of machine learning algorithms to form the predictive model. The training repository may be a storage device, such as a memory. The training repository may be in cloud storage.

The machine learning may use any appropriate machine learning algorithm. In some non-limiting examples, the machine learning algorithm is a reinforcement learning algorithm, a value reinforcement algorithm, a supervised learning algorithm, an unsupervised learning algorithm, a deep learning algorithm, an artificial neural network algorithm, a Q-learning algorithm, a polar reinforcement algorithm, or other type of machine learning algorithm.

In some examples, the machine learning (e.g., used by the training system) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by the training system) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the BS's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by the training system), such as recurrent neural networks (RNNs), multi-layer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using a machine learning algorithm, the training system generates vectors from the information in the training repository. In some examples, the training repository stores vectors. In some examples, the vectors map one or more features to a label. For example, the features may correspond to various one or more actions for a data transmission configuration and/or various states. The label may correspond to various predicted outcomes for those actions and states. The predictive model training manager may use the vectors to train the predictive model. As discussed above, the vectors may be associated with weights in the machine learning algorithm.

In some examples, reinforcement learning is modeled as a Markov Decision Process (MDP). A MDP is a discrete, time stochastic, control process. The MDP provides a mathematical framework for modeling decision making in situations where outcomes may be partly random and partly under the control of a decision maker. In MDP, at each time step, the process is in a state, of a set of S finite states, and the decision maker may choose any action, of a finite set of actions A, that is available in that state. The process responds at the next time step by randomly moving into a new state, and giving the decision maker a corresponding reward, where $R_\alpha(s,s')$ is the immediate reward (or expected immediate reward) after transitioning from state s to state s'. The probability that the process moves into its new state is influenced by the chosen action, for example, according to a state transition function. The state transition may be given by $P_\alpha(s,s') = \Pr(s_{t+1}=s'|s_t=s, \alpha_t=\alpha)$.

An MDP seeks to find a policy for the decision: a function of π that specifies the action π(s) that the decision maker will choose when in state s. The goal is to choose a policy π that maximizes the rewards. For example, a policy that maximizes a cumulative function of the rewards, such as a discounted summation. The following shows an example function:

$$\Sigma_{t=0}^{\infty} \gamma^t R_{\alpha_t}(s_t, s_{t+1}), \text{ where}$$

$\alpha_t = \pi(s_t)$, the action given by the policy, and γ is the discount factor and satisfies $0 \leq \gamma \leq 1$.

The solution for the MDP is a policy which describes the best action for each state in the MDP, for example that maximizes the expected discounted reward.

In some examples, a partially observable MDP is used (POMDP). POMDP may be used when the state may not be known when the action is taken, and, therefore, the probabilities and/or rewards may be unknown. For POMDP, reinforcement learning may be used. The following function may be defined:

$$Q(s,\alpha) = \Sigma_s P_\alpha(s,s')(R_\alpha(s,s') + \gamma V(s')),$$

where V(s') is the discounted cumulative reward.

Experience during learning may be based on (s,a) pairs together with the outcome s'. For example, if the node was previously in a state s, and made a base station analog/digital precoders, MCS, RV index, DMRS configuration, resource allocation selection (among other actions) a, and achieved a throughput s'. In this example, the node may update the array Q directly based on the learned experience. This may be referred to as Q-learning. In some examples, the learning algorithm may be continuous.

The framework of reinforcement learning provides the tools to optimally solve the POMDP. The learning changes the weights of the multi-level perceptron (e.g., the neural net) that decides on the next action to take. The algorithm in deep machine learning is encoded in the neural net weights. Thus, changing the weights changes the algorithm.

In some examples, the machine learning-based data transmission configuration uses a deep learning algorithm. The deep learning algorithm may be a deep Q network (DQN) algorithm implemented by a neural network.

In some examples, the machine learning algorithm is modeled as a POMDP with reinforcement learning. A POMDP can be used when the state may not be known when the action is taken, and, therefore, the probabilities and/or rewards may be unknown. For POMDP, reinforcement learning may be used. The Q array may be defined as:

$$Q_{i+1}(s,\alpha) = E\{r + \gamma \max Q_i(s',\alpha')|s,\alpha\}.$$

According to certain aspects, the machine learning-based data transmission configuration allows for continuous infinite learning. In some examples, the learning may be augmented with federated learning. For example, while some machine learning approaches use a centralized training data on a single machine or in a data center; with federated learning, the learning may be collaborative involving multiple devices to form the predictive model. With federated learning, training of the model can be done on the device, with collaborative learning from multiple devices.

Additional Considerations

The preceding description provides examples of beam coordination in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communication by a network entity, comprising:
    a memory comprising instructions; and
    one or more processors configured to execute the instructions and cause the apparatus to:
        determine a distance between the network entity and a user equipment (UE);
        determine a number of beams for beamforming and a beam refinement procedure based on the distance between the network entity and the UE; and
        transmit a number of reference signals (RSs) using the determined number of beams.

2. The apparatus of claim 1, wherein the network entity is a transmission and reception point (TRP) of a plurality of TRPs participating in a multi-TRP (mTRP) communication with the UE.

3. The apparatus of claim 1, wherein the one or more processors are further configured to execute the instructions and cause the apparatus to transmit one or more positioning reference signals (PRSs) or other RSs, and wherein determining the distance comprises determining the distance based on the one or more PRSs or other RSs.

4. The apparatus of claim 1, wherein determining the distance comprises determining the distance based on a reference signal received power (RSRP) associated with a set of RSs, wherein the set of RSs comprises at least one of: a synchronization signal block (SSB) or a channel state information (CSI)-RS.

5. The apparatus of claim 1, wherein determining the distance comprises determining the distance based on a machine learning model.

6. The apparatus of claim 1, wherein determining the distance comprises receiving a value of the distance between the network entity and the UE from the UE.

7. The apparatus of claim 6, wherein determining the number of beams comprises receiving the number of the beams based on the distance between the network entity and the UE.

8. The apparatus of claim 1, wherein the one or more processors are further configured to execute the instructions and cause the apparatus to: receive a beam report indicating one or more optimal beams detected by the UE based on a network entity-specific threshold.

9. The apparatus of claim 8, wherein the network entity-specific threshold is a signal strength threshold.

10. The apparatus of claim 8, wherein the network entity-specific threshold is based on the distance between the network entity and the UE.

11. The apparatus of claim 2, wherein the one or more processors are further configured to execute the instructions and cause the apparatus to: coordinate beams across each of the plurality of TRPs participating in the mTRP communication with the UE based on their distance from the UE and a distance-determined restriction of allowed beams across the plurality of TRPs.

12. The apparatus of claim 1, wherein the one or more processors are further configured to execute the instructions and cause the apparatus to: map a beamwidth of a beam used at the UE to the number of RSs allocated for the beam refinement procedure.

13. The apparatus of claim 12, wherein the beamwidth is more than a first threshold when the number of beams are less than a second threshold, and the beamwidth is less than the first threshold when the number of beams are more than the second threshold.

14. The apparatus of claim 1, wherein the one or more processors are further configured to execute the instructions and cause the apparatus to: allocate UE-specific RS resources without receiving a request from the UE for the UE-specific RS resources.

15. An apparatus for wireless communication by a user equipment (UE), comprising:
    a memory comprising instructions; and
    one or more processors configured to execute the instructions and cause the apparatus to:
        determine a distance between the UE and a network entity;
        transmit an indication indicating a number of beams for beamforming and a beam refinement procedure determined based on the distance between the network entity and the UE; and
        receive a number of reference signals (RSs) using the indicated number of beams at the UE.

16. The apparatus of claim 15, wherein the network entity is a transmission and reception point (TRP) of a plurality of TRPs participating in a multi-TRP (mTRP) communication with the UE.

17. The apparatus of claim 15, wherein the one or more processors are further configured to execute the instructions and cause the apparatus to: transmit a beam report indicating one or more optimal beams detected by the UE based on a network entity-specific threshold.

18. The apparatus of claim 17, wherein the network entity-specific threshold is a signal strength threshold.

19. The apparatus of claim 17, wherein the network entity-specific threshold is based on the distance between the network entity and the UE.

20. A method for wireless communications by a network entity, comprising:
    determining a distance between the network entity and a user equipment (UE);
    determining a number of beams for beamforming and a beam refinement procedure based on the distance between the network entity and the UE; and
    transmitting a number of reference signals (RSs) using the determined number of beams.

21. The method of claim 20, wherein the network entity is a transmission and reception point (TRP) of a plurality of TRPs participating in a multi-TRP (mTRP) communication with the UE.

22. The method of claim 20, further comprising transmitting one or more positioning reference signals (PRSs) or other RSs, and wherein the determining the distance comprises determining the distance based on the one or more PRSs or other RSs.

23. The method of claim 20, wherein the determining the distance comprises determining the distance based on a reference signal received power (RSRP) associated with a set of reference signals (RSs), wherein the set of RSs comprises at least one of: a synchronization signal block (SSB) or a channel state information (CSI)-RS.

24. The method of claim 20, wherein the determining the distance comprises determining the distance based on a machine learning model.

25. The method of claim 20, wherein the determining the distance comprises receiving a value of the distance between the network entity and the UE, and the determining the number of beams comprises receiving the number of the beams based on the distance between the network entity and the UE.

26. A method for wireless communications by a user equipment (UE), comprising:
    determining a distance between the UE and a network entity;
    transmitting an indication indicating a number of beams for beamforming and a beam refinement procedure determined based on the distance between the network entity and the UE; and
    receiving a number of reference signals (RSs) using the indicated number of beams at the UE.

27. The method of claim 26, wherein the network entity is a transmission and reception point (TRP) of a plurality of TRPs participating in a multi-TRP (mTRP) communication with the UE.

28. The method of claim 26, further comprising transmitting a beam report indicating one or more optimal beams detected by the UE based on a network entity-specific threshold.

29. The method of claim 28, wherein the network entity-specific threshold is a signal strength threshold.

30. The method of claim 28, wherein the network entity-specific threshold is based on the distance between the network entity and the UE.

* * * * *